(12) United States Patent
Triebold et al.

(10) Patent No.: US 9,341,009 B2
(45) Date of Patent: May 17, 2016

(54) MULTI-AXIS CLIP HINGE

(71) Applicant: REELL PRECISION MANUFACTURING CORPORATION, St. Paul, MN (US)

(72) Inventors: Allan Triebold, Cottage Grove, MN (US); David Wahlstedt, Excelsior, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 14/221,987

(22) Filed: Mar. 21, 2014

(65) Prior Publication Data

US 2014/0283337 A1    Sep. 25, 2014

Related U.S. Application Data

(60) Provisional application No. 61/804,035, filed on Mar. 21, 2013.

(51) Int. Cl.
*F16C 11/06* (2006.01)
*E05D 7/00* (2006.01)
*E05D 7/06* (2006.01)

(52) U.S. Cl.
CPC .. *E05D 7/00* (2013.01); *E05D 7/06* (2013.01); *F16C 11/069* (2013.01); *F16C 11/0623* (2013.01); *F16C 2226/74* (2013.01); *Y10T 16/524* (2015.01)

(58) Field of Classification Search
CPC ....... E05D 7/06; E05D 7/1005; E05D 7/1011; E05D 11/04; E05D 2011/045; E05D 2007/1033; E05D 2007/1038; Y10T 16/524; F16C 11/069
See application file for complete search history.

(56) References Cited

U.S. PATENT DOCUMENTS

| | | | |
|---|---|---|---|
| 315,936 | A | 11/1885 | Pfingst |
| 1,166,551 | A | 1/1916 | Simmons |

(Continued)

FOREIGN PATENT DOCUMENTS

| | | |
|---|---|---|
| CH | 270326 | 8/1950 |
| DE | 461065 | 3/1929 |

(Continued)

OTHER PUBLICATIONS

International Search Report and the Written Opinion for International Application No. PCT/US2014/031463 mailed Jul. 9, 2014 (13 pages).

*Primary Examiner* — Jeffrey O Brien
(74) *Attorney, Agent, or Firm* — Dicke, Billig & Czaja, PLLC

(57) ABSTRACT

One aspect is a multi-axis clip hinge with a rotatable member having a spherical portion with a greatest outer diameter and a coupling portion for articulating said member. A clip is provided having an arm defining an inside diameter and comprising a connecting portion. The inside diameter of the arm is less than the greatest outer diameter of the spherical portion of the rotatable member and is engaged therewith such that it interferes with and grips the outside diameter of the spherical portion. A housing is configured to engage the connection portion of the clip thereby securing the clip to the housing. At least one of the clip and the housing prevents relative translational movement of the clip relative to the spherical portion yet allows the spherical portion to rotate in three axes of rotation relative to the clip.

13 Claims, 21 Drawing Sheets

(56) References Cited

U.S. PATENT DOCUMENTS

| | | | |
|---|---|---|---|
| 2,462,304 A | 2/1949 | Burdick | |
| 2,605,926 A | 8/1952 | Casey | |
| 2,610,355 A * | 9/1952 | Becker | A42B 1/062 16/224 |
| 3,030,783 A | 4/1962 | Schmidt | |
| 3,213,500 A | 10/1965 | Thompson | |
| 3,395,553 A | 8/1968 | Stout | |
| 3,685,094 A * | 8/1972 | Goossev | E05D 5/023 162/224 |
| 3,714,678 A * | 2/1973 | Weisz | E05D 11/04 16/224 |
| 3,765,054 A | 10/1973 | Johnson | |
| 4,190,929 A | 3/1980 | Palka | |
| 4,227,283 A | 10/1980 | Mathewson et al. | |
| 4,688,961 A | 8/1987 | Shioda et al. | |
| 4,790,504 A | 12/1988 | Wills et al. | |
| 4,916,968 A | 4/1990 | Kabaya | |
| 4,986,507 A | 1/1991 | Chiang | |
| 5,010,983 A | 4/1991 | Kitamura | |
| 5,018,244 A | 5/1991 | Hino | |
| 5,037,231 A | 8/1991 | Kitamura | |
| 5,041,818 A | 8/1991 | Liu | |
| 5,043,846 A | 8/1991 | Kinoshita | |
| 5,052,078 A | 10/1991 | Hosoi | |
| 5,064,137 A | 11/1991 | Komatsu | |
| 5,088,156 A | 2/1992 | Hosoi | |
| 5,108,062 A | 4/1992 | Detwiler | |
| 5,197,704 A | 3/1993 | Kitamura | |
| 5,211,368 A | 5/1993 | Kitamura | |
| 5,219,240 A | 6/1993 | Kitamura | |
| 5,231,734 A | 8/1993 | Rude | |
| 5,235,494 A | 8/1993 | Chang et al. | |
| 5,249,334 A * | 10/1993 | Horberg | E05D 5/121 16/224 |
| 5,263,227 A * | 11/1993 | Hrbek | E05D 5/121 16/224 |
| 5,354,028 A | 10/1994 | Kitamura | |
| 5,364,149 A | 11/1994 | Aymerich et al. | |
| 5,491,874 A | 2/1996 | Lowry et al. | |
| 5,509,176 A | 4/1996 | Karl | |
| 5,613,275 A | 3/1997 | Kolberg et al. | |
| 6,301,748 B1 | 10/2001 | Su-Man | |
| RE37,712 E * | 5/2002 | Gannon | E05D 11/082 16/342 |
| 6,467,129 B1 | 10/2002 | Bae | |
| 6,530,123 B1 | 3/2003 | Wahlstedt | |
| 7,607,202 B1 | 10/2009 | Lee | |
| 8,245,356 B2 | 8/2012 | Chu et al. | |
| 8,875,348 B2 | 11/2014 | Kossett | |
| 2004/0187261 A1 * | 9/2004 | Haenlein | E05D 3/10 16/366 |
| 2006/0140712 A1 * | 6/2006 | Sun | F16C 11/0628 403/135 |
| 2006/0225361 A1 * | 10/2006 | Scheer | E05D 11/04 49/397 |
| 2007/0094845 A1 | 5/2007 | Chang et al. | |
| 2007/0101543 A1 | 5/2007 | Lu et al. | |
| 2008/0201901 A1 * | 8/2008 | Cescon | F16C 11/0604 16/228 |
| 2008/0308755 A1 * | 12/2008 | Hashizume | G06F 1/1616 250/553 |
| 2009/0139054 A1 * | 6/2009 | Burnley | E05D 3/022 16/224 |
| 2009/0205167 A1 * | 8/2009 | Easley | B29C 45/14336 16/224 |
| 2009/0293229 A1 | 12/2009 | Chiang | |
| 2010/0236020 A1 * | 9/2010 | Tsai | F16C 11/0604 16/224 |
| 2012/0174339 A1 | 7/2012 | Novin | |
| 2014/0059805 A1 | 3/2014 | Krahn et al. | |
| 2014/0165331 A1 * | 6/2014 | Kang | F16C 11/0652 16/224 |

FOREIGN PATENT DOCUMENTS

| | | |
|---|---|---|
| DE | 1260236 | 2/1968 |
| WO | 9720125 | 6/1997 |
| WO | 0206692 | 1/2002 |
| WO | 02084056 | 10/2002 |
| WO | 2006110133 | 10/2006 |

* cited by examiner

MULTI-AXIS CLIP HINGE

CROSS REFERENCE TO RELATED APPLICATIONS

This Non-Provisional Patent Application claims the benefit of the filing date of U.S. Provisional Patent Application Ser. No. 61/804,035, filed Mar. 21, 2013, entitled "MULTI-AXIS CLIP HINGE," which is herein incorporated by reference.

BACKGROUND

So called "ball-and socket" type hinges, typically include a pivotable ball that allows adjustments for three-axis rotation in a single device. Most such devices, however, rely on flexible tabs or similar means of applying pressure that typically fail to give consistent positioning torque. Some such devices fail to give positioning torque sufficient to withstand gravitational and environmental forces, resulting in poor positioning and many give varying positioning torque for different axes of rotation. Some also include high "break-away" torque for initial movement and many require complex and costly additional hardware to increase force between the ball-and-socket. For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
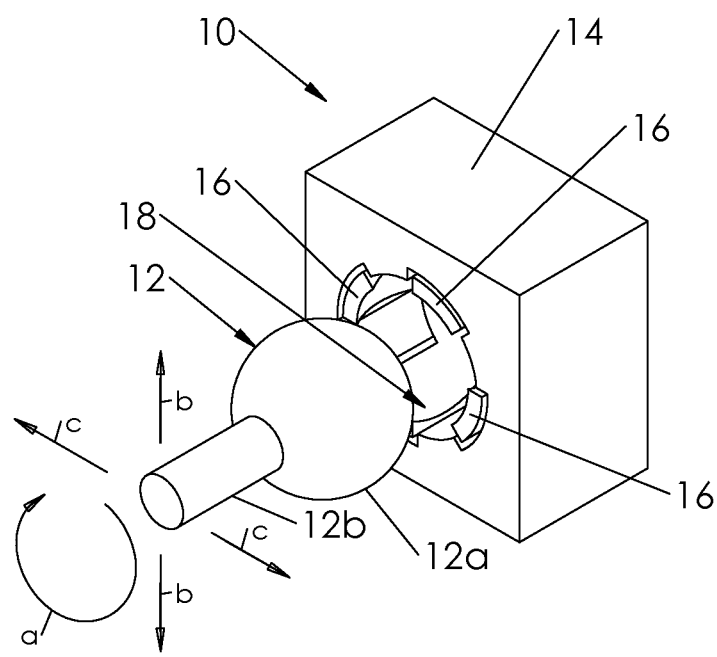
FIG. 1 is a perspective view of a multi-axis hinge in accordance with the prior art.

FIG. 1 illustrates multi-axis hinge 10 in accordance with the prior art. Multi-axis hinge 10 is essentially a "ball-and-socket" type hinge, including pivotable ball 12 and socket housing 14. Pivotable ball 12 includes ball 12a and input rod 12b. Housing 14 includes a plurality of flexible tabs 16 within a socket 18 formed in one of its surfaces. Pivotable ball 12 fits into socket 18 by a simple snap-fit provided by flexible tabs 16 molded into the socket 18. The diameter of ball 12a is slightly larger than the receiving diameter of socket 18 such that flexible tabs 16 are pushed outward thereby asserting an inward force on ball 12a.

Such a configuration is typically used in such applications as positioning of rear view mirrors in automobiles. Also, with the proliferation of personal electronic devices, such devices are also used to provide mounting and positioning for these personal devices. Such ball-and-socket type hinges for these mounting and adjustments allow for three-axis rotation in a single device. Specifically, as oriented in the view of FIG. 1, input rod 12b can be 1) rotated about its axis, as illustrated by arrow a, 2) moved up and down, as illustrated by arrows b, and 3) moved side to side, as illustrated by arrows c, as well as moved to the various locations between those arrows. Allowing all three of these axes of rotation is useful in many applications.

Devices such as multi-axis hinge 10 allow three-axis rotation by virtue of the complementary geometries of the ball and socket, which also serve to position one element against the other to provide consistency of motion. In order to provide this positioning over many thousands of cycle, the ball-and-socket elements need to be loaded against each other to provide a resisting shearing force upon relative motion between the two, and to provide subsequent positioning of one element against disturbing forces such as gravity and vibration. Also, the material of the ball and socket must be chosen to provide long life and low wear over many thousands of cycles of relative motion.

Multi-axis hinge 10 develops loading between ball 12 and socket 18 by integrally molded flexible tabs 16 in socket 18 which provide a snap fit. However, the deflection of these flexible tabs 16 often provides too little resulting holding force for an application. Subsequently, flexible tabs 16 often need to be supplemented with a metallic stiffening member to provide greater force for the same deflection. In some instances, the socket assembly needs to be further compressed against the ball by use of an external spring. Such added features complicate the design and are not always effective over many rotations.

Furthermore, such devices often fail to give consistent positioning torque. They also often fail to give positioning torque sufficiently to withstand gravitational and environmental forces, resulting in poor positioning and unwanted movement when the device is jarred or subjected to unexpected outside forces. Such devices will also typically provide varying positioning torque for different axes of rotation. For some, high "break-away" torque is required to initiate movement and some may require additional hardware to increase force between the ball-and-socket.

Figure 2:
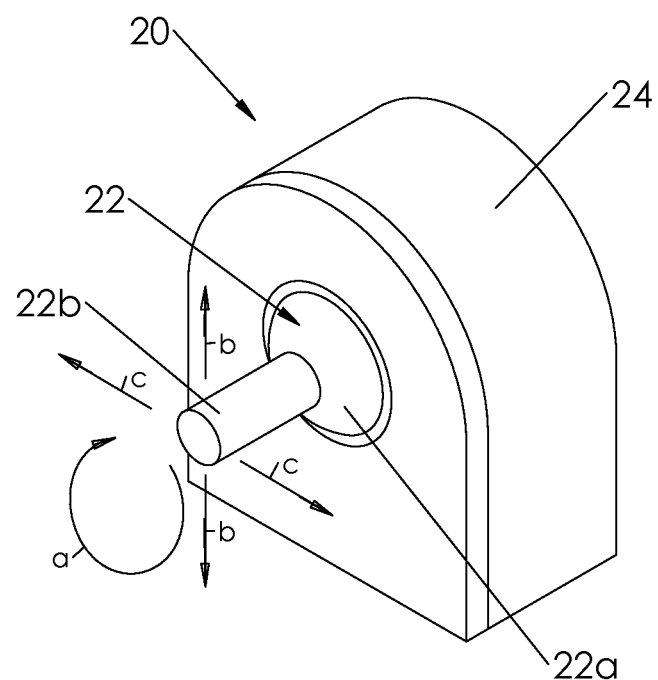
FIG. 2 is a perspective view of a multi-axis clip hinge in accordance with one embodiment.

Accordingly, FIG. 2 illustrates multi-axis clip hinge 20 in accordance with one embodiment, which is configured to provide consistent reliable torque performance over many thousands of cycles. Multi-axis clip hinge 20 includes pivotable ball 22 and housing 24. Pivotable ball 22 includes ball 22a and input rod 22b. Rather than using a ball-and socket connection, however, housing 24 includes a clip 26 (illustrated in FIG. 3, for example) within housing 24 to provide three axes of rotation, such that input rod 22b can be 1) rotated about its axis, as illustrated by arrow a, 2) moved up and down, as illustrated by arrows b, and 3) moved side to side, as illustrated by arrows c, as well as moved to the various locations between those arrows.

Allowing all three of these axes of rotation is useful in many applications. Furthermore, multi-axis clip hinge 20 is configured to give consistent positioning torque, including high enough positioning torque to withstand gravitational and outside environmental forces. In one embodiment, multi-axis clip hinge 20 is also configured to provide consistent positioning torque for different axes of rotation while requiring minimal break-away torque for initial movement.

Figure 3:
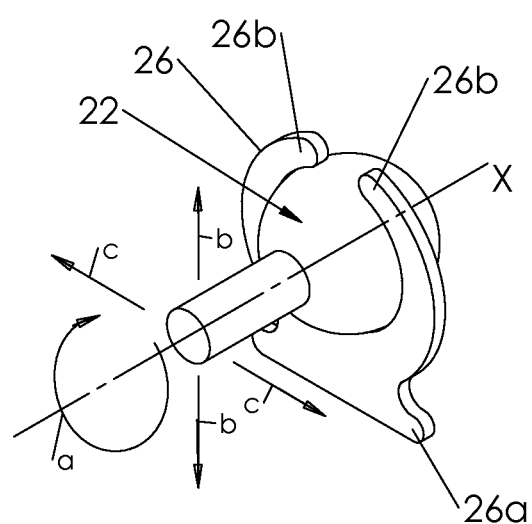
FIG. 3 is a perspective view of a portion of a multi-axis clip hinge in accordance with one embodiment.

FIG. 3 illustrates a portion of a multi-axis clip hinge 20 in accordance with one embodiment. Housing 24 (and some additional elements that will be discussed below) are removed so that clip 26 is visible positioned about the greatest diameter of ball 22a, thereby resulting in the greatest interference between ball 22a and clip 26, and accordingly, the greatest positioning torque. It is this interference between the two that provides this positioning torque.

In one embodiment, clip 26 is a relatively thin metal clip having spaced apart arms 26b that form an inside diameter that is slightly smaller, when clip 26 is in a relaxed state, than the greatest outer diameter of ball 22a. Clip arms 26b are configured to substantially contain ball 22a when clip 26 is positioned over ball 22a. As such, once clip 26 is positioned over ball 22a, clip 26 and arms 26a provide and inward force down upon ball 22a as a result of its inside diameter being forced slightly open by the larger ball 22a diameter. This results in favorable positioning torque as ball 22a is rotated in any of the three axes of rotation (a/b/c) described above. Clip 26 is further provided with feet 26b (one foot partially obscured in FIG. 3, but illustrated, for example, more fully in FIG. 6a), which are configured to be engaged by housing 24 such that clip 26 cannot be rotated relative to housing 24 with rotation of pivotable ball 22.

Unlike snap-fit type features, which have large manufacturing tolerances and subsequent large torque variations, ball 22a and clip 26 are manufactured to small tolerances at low cost, with resulting high precision torque. In addition, ball 22a and clip 26 can be made from a variety of engineering materials to satisfy reliability and torque consistency requirements. For example, both ball 22a and clip 26 can be made from hardened steel and lubricated with grease in applications requiring very high torque in a small volume. In one embodiment, clip 26 may be stamped from sheet metal.

Figure 4A:
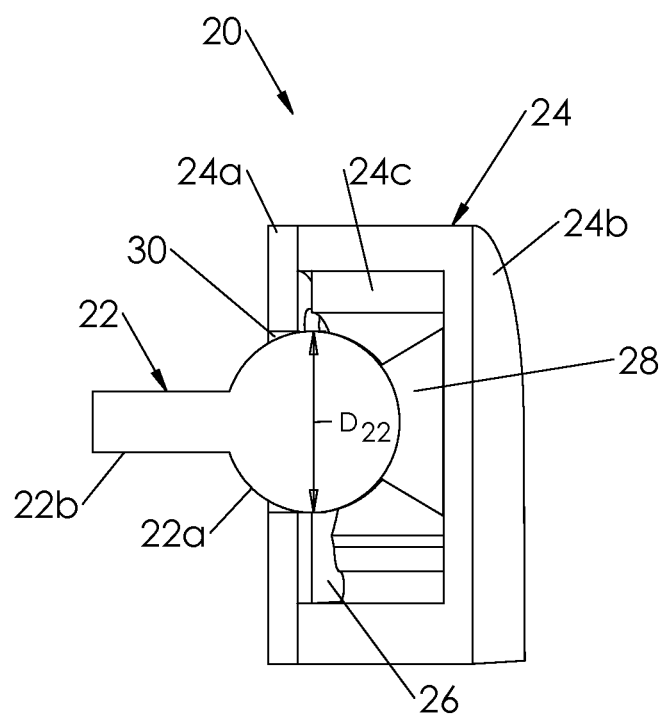
FIG. 4a is a cross-sectional view of a multi-axis clip hinge in accordance with one embodiment.
Figure 4B:
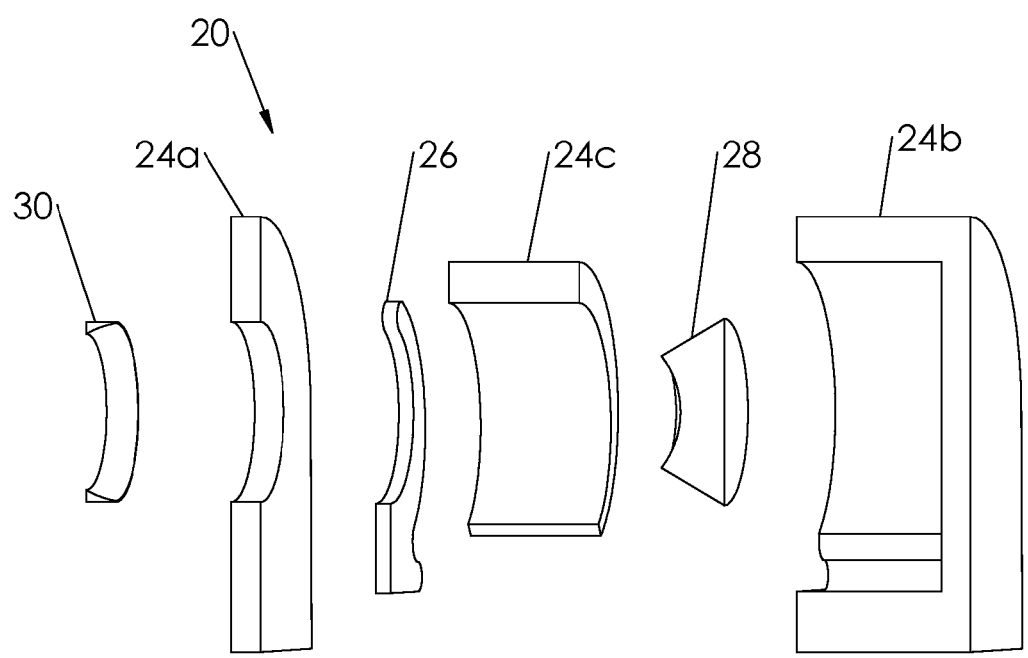
FIG. 4b is an exploded cross-sectional view of a multi-axis clip hinge in accordance with one embodiment.
Figure 4C:
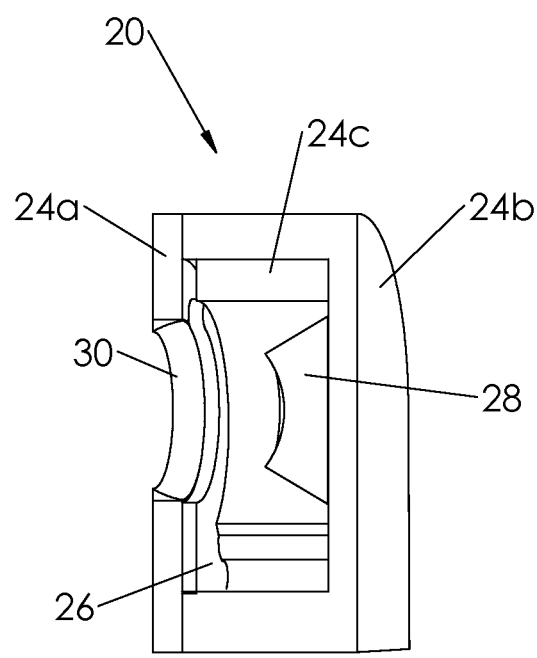
FIG. 4c is cross-sectional view of a portion of a multi-axis clip hinge in accordance with one embodiment.

In order to ensure there is consistent torque as input rod 22b is moved in all three axes (about its axis (arrow a); moved up and down (arrows b); and moved side to side (arrows c)), ball 22a needs to remain centered within clip 26. Accordingly, housing 24 is provided with features to secure ball 22a within clip 26. FIGS. 4a-4c illustrate additional details of multi-axis clip hinge 20. Multi-axis clip hinge 20 includes pivotable ball 22, housing 24 and clip 26 as discussed. Furthermore, housing 24 includes face plate 24a, housing body 24b, and clip restraint 24c. Furthermore provided are first bearing support 28 and second bearing support 30. As assembled, multi-axis clip hinge 20 retains ball 22a centered within clip 26 thereby allowing consistent torque as input rod 22b is moved in all three axes.

In operation, first and second bearing support 28 and 30 secure ball 22a within housing allowing its rotation in the three axes of rotation, but preventing translational movement, that is, restricting movement along the x-axis illustrated in FIG. 3 along input rod 22b (and restricting left and right movement as depicted in FIGS. 4a-4c). Securing ball 22a translationally relative to clip 26 in this way ensures that the central or greatest diameter $D_{22}$ of ball 22a remains engaged with clip 26 throughout various rotations in the three axes of rotation in order for multi-axis clip hinge 20 to provide consistent torque. If the greatest diameter $D_{22}$ of ball 22a is allowed to move along the x-axis (FIG. 3) with respect to clip 26, the interference between them will be lowered and positioning torque will be affected. In one embodiment, unlike a traditional ball-and-socket joint, the geometries of clip 26 and ball 22a do not by themselves prevent translational motion or provide secure positioning between the centers of clip 26 and ball 22a.

In addition, face plate 24a, housing body 24b, and clip restraint 24c cooperate to hold clip 26 securely within housing 24, yet still allow arms 26b (FIG. 3) to flex as needed to accommodate rotation of the larger diameter ball 22a. As best illustrated in FIG. 4c, clip restraint 24c is spaced slightly away from face plate 24a, by substantially the width of clip 26, thereby providing a slot into which clip 26 fits. In this way, clip arms 26b are free to flex in the radial direction outward from interference from ball 22a. However, when assembled face plate 24a prevents the bending of arms 26b outward (relative to housing 24) and clip restraint 24c prevents bending of arms 26b inward (relative to housing 24) with applied forces to input rod 22b. Housing body 24b is also configured with a feature complementary to clip foot 26a, such that clip 26 cannot rotate relative to housing 24 with applied forces to input rod 22b once feet 26a are seated in the feature of housing body 24b.

In operation, multi-axis clip hinge 20 retains clip 26 securely within housing 24 such that ball 22a is securely retained centered within housing 24 and its greatest outer diameter retained centered within clip 26. Multi-axis clip hinge 20 provides consistent positioning torque over all three axes of rotation, for thousands of rotations, without complicated designs, and without requiring an abundance of parts.

Figure 5A:
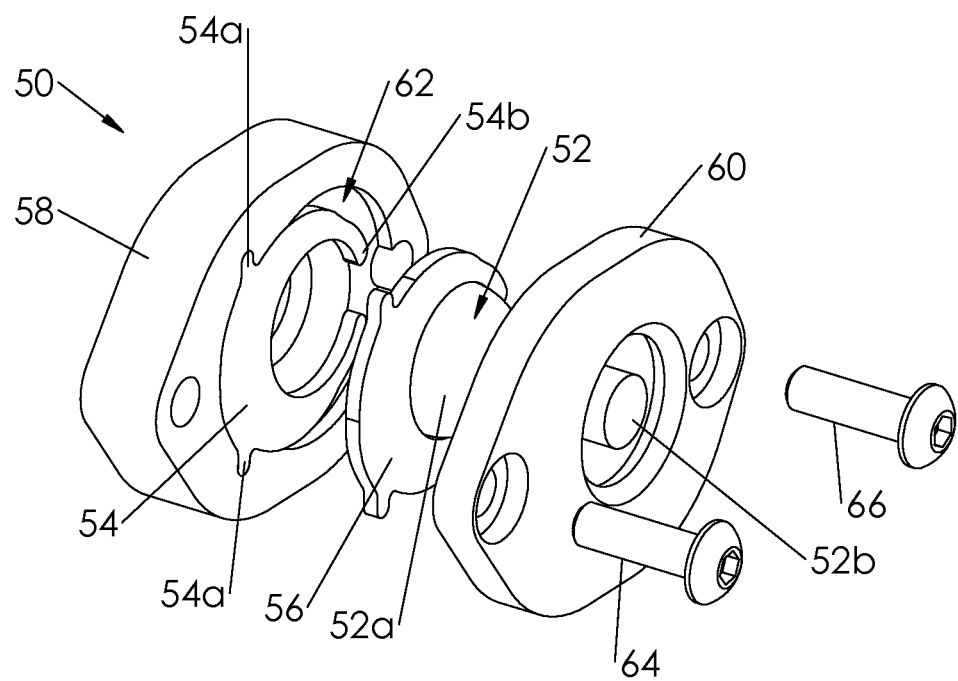
FIG. 5a is an exploded perspective view of a multi-axis clip hinge in accordance with one embodiment.

FIG. 5a illustrates multi-axis clip hinge 50 in accordance with one embodiment. Multi-axis clip hinge 50 is configured to provide consistent reliable torque performance in all three axes of rotation, as described above with respect to multi-axis clip hinge 20. Multi-axis clip hinge 50 includes pivotable ball 52 and first and second housing halves 58 and 60. Pivotable ball 52 includes ball 52a and input rod 52b. When assembled, first and second housing halves 58 and 60 are mated together and secured with first and second fasteners 64 and 66 such that halves 58 and 60 secure and contain first and second clips 54 and 56 and secure and substantially contain pivotable ball 52.

Multi-axis clip hinge 50 is configured similarly to multi-axis clip hinge 20 above, but further includes two clips, rather than a single clip. In one embodiment, each of clips 54 and 56 are respectively seated within a slot formed within first and second housing halves 58 and 60. Slot 62 in first housing half 58 is illustrated in FIG. 5a holding first clip 54. As illustrated, slot 62 conforms to first clip 54 such that it provides a complementary shape for clip feet 54a. In this way, there can be no relative movement of first housing half 58 and first clip 54. As further illustrated, slot 62 accommodates clips arms 54b without interference so that clip arms 54b may flex radially as they are engaged in interference with ball 52a. Second housing 60 has a mirror image slot configured to receive second clip 56 in the same way.

As such, when multi-axis clip hinge 50 is assembled, first and second housing halves 58 and 60 secure first and second clips 54 and 56 such that forces applied to input rod 52b will not move clips 54 and 56 relative to ball 52a. Furthermore, when multi-axis clip hinge 50 is assembled and first and second housing halves 58 and 60 are brought together, ball 52a is firmly held by interference contact with arms 54b and 56b of clips 54 and 56. This allows rotation of input rod 52b in the three axes of rotation, but preventing translational movement of ball 52a relative to clips 54 and 56.

Figure 5B:
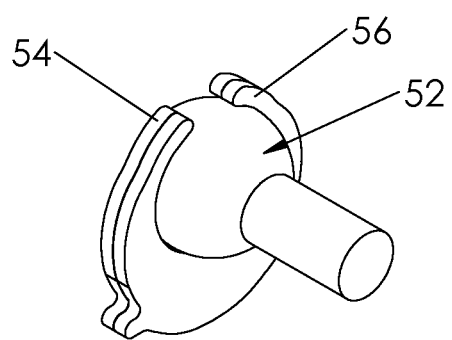
FIG. 5b is a perspective view of a portion of a multi-axis clip hinge in accordance with one embodiment.

FIG. 5b illustrates a portion of multi-axis clip hinge 50 with first and second housing halves 58 and 60 removed, such that first and second clips 54 and 56 are provided over ball 52a. In one embodiment, first and second clips 54 and 56 are centered over the center or greatest diameter $D_{52}$ of ball 52a, such that the center of ball 52a falls between first and second clips 54 and 56. Each of first and second clips 54 and 56 form an inside diameter when in a relaxed state that is slightly smaller than the greatest outside diameter $D_{52}$ of ball 52a. As such, there is an interference fit between each of first and second clips 54 and 56 and ball 52a when the clips are forced over the ball, and first and second clips 54 and 56 essentially capture the greatest outside diameter $D_{52}$ of ball 52a between them.

Figure 5C:
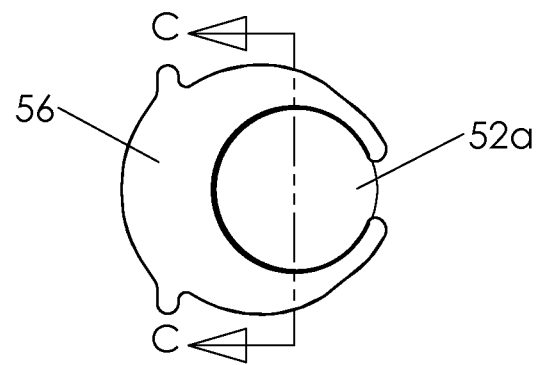
FIG. 5c is a cross-sectional view of a portion of a multi-axis clip hinge illustrating sectional line c-c in accordance with one embodiment.
Figure 5D:
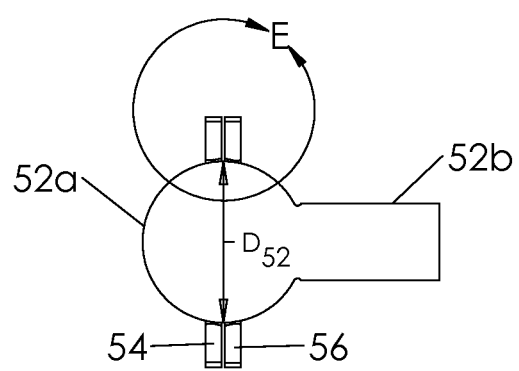
FIG. 5d is a cross-sectional view of the portion of the multi-axis clip hinge in FIG. 5c viewed from sectional line c-c.

FIG. 5c is a cross-sectional view of a portion of multi-axis clip hinge 50 with first and second housing halves 58 and 60 removed. Also, FIG. 5c illustrates sectional line c-c extending through ball 52a and portions of first and second clips 54 and 56. FIG. 5d is a cross-sectional view of that portion of multi-axis clip hinge 50 as viewed from line c-c of FIG. 5c. Portions of first and second clips 54 and 56 are illustrated over ball 52a, and an enlarged section E is designated.

Figure 5E:
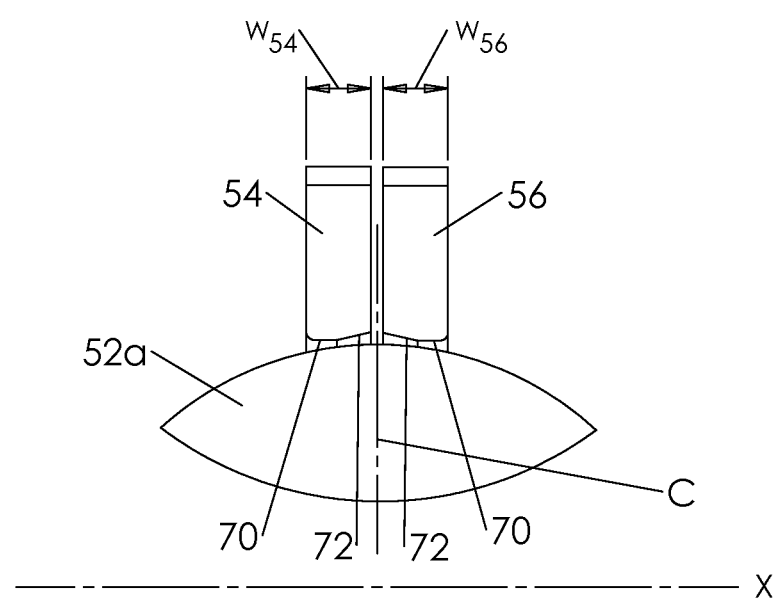
FIG. 5e is an enlarged view of the portion of the multi-axis clip hinge labeled E in FIG. 5d.

FIG. 5e illustrates an enlarged view of the section E of first and second clips 54 and 56 over ball 52a illustrated from FIG. 5d. As indicated, each of first and second clips 54 and 56 respectively have a clip width $W_{54}$ and $W_{56}$ in the x-axis direction. The centerline C of ball 52a is also illustrated and falls between first and second clips 54 and 56. Once first and second housing halves 58 and 60 are secured over first and second clips 54 and 56 and ball 52a, with first and second clips 54 and 56 seated in the slots provided in the halves, rotational movement of ball 52a in the three axes is allowed within first and second clips 54 and 56, but no translational movement is allowed between ball 52a and first and second clips 54 and 56. Stated another way, the force fit between first and second housing halves 58 and 60 and first and second clips 54 and 56 over ball 52a prevents ball 52a from moving relative to the width $W_{54}$ and $W_{56}$ of clips 54 and 56 in the x-axis.

FIG. 5e also illustrates first and second surface portions 70 and 72 of clips 54 and 56. In one embodiment, first and second clips 54 and 56 are stamped from a sheet of metal, for example, using a die. As the die first penetrates the metal, the surface of the cut portion tends to be fairly smooth and fairly faithful to the dimensions of the die tool. As the die penetrates deeper into the metal however, the die tends to tear the metal leaving a less straight portion of the surface. First surface portion 70 illustrates where die-stamped first and second clips 54 and 56 were first penetrated with the die and are relatively straight. Second surface portions 72 illustrate where die-stamped first and second clips 54 and 56 were torn with the die and are less straight and more angled.

In one embodiment, first and second clips 54 and 56 are oriented relative to each other and to ball 52a such that second surface portions 72, or the torn portions, are next to each other. In one example, this provides a smoother overall torque profile for multi-axis clip hinge 50. In one embodiment, first and second clips 54 and 56 are oriented relative to each other and to ball 52a such that first surface portions 70, or the cut portions, are next to each other. In one example, this provides a higher density torque profile for multi-axis clip hinge 50.

Figure 6A:
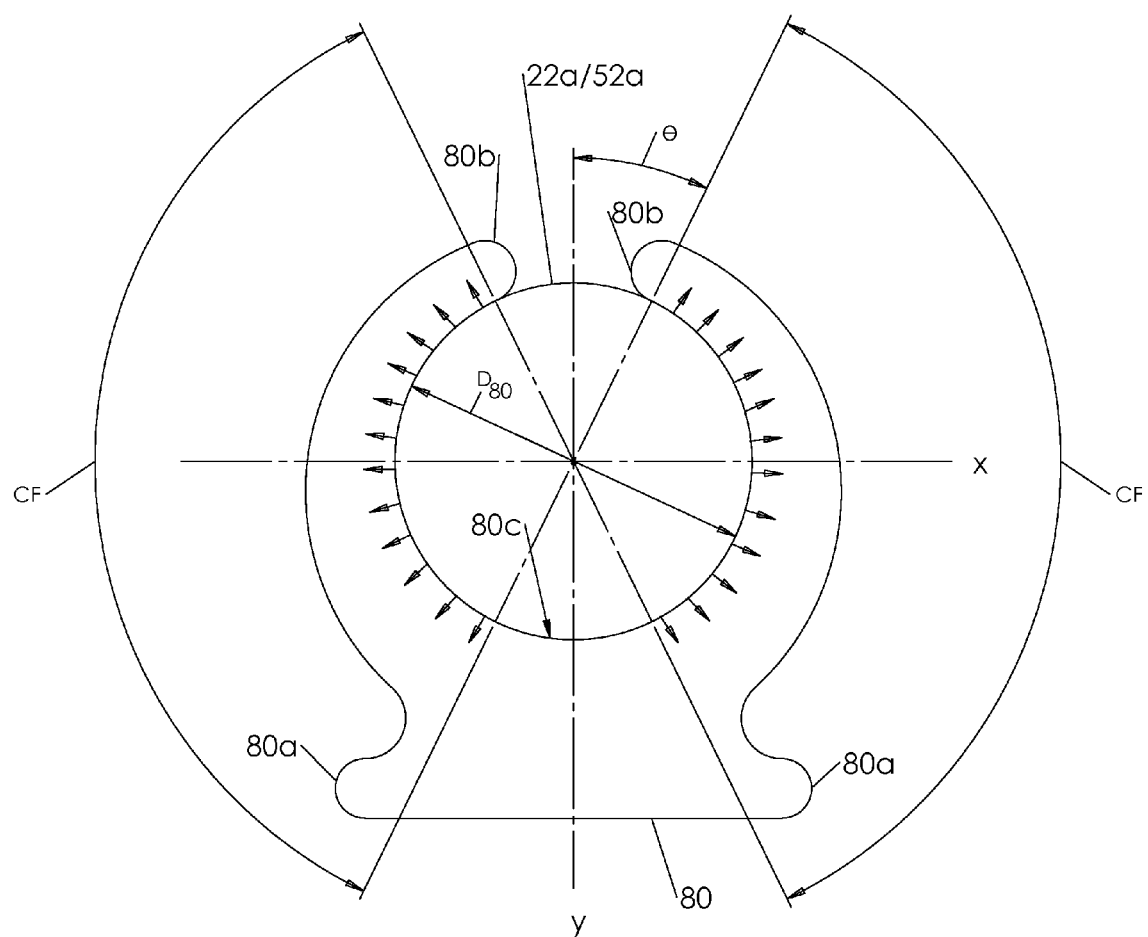
FIGS. 6a-6d are perspective views of a clip from a multi-axis clip hinge illustrating forces in accordance with one embodiment.

FIG. 6a illustrates clip 80, such as could be used in either multi-axis clip hinge 20 or 50 described above. Clip 80 includes clip arms 80b and clip feet 80a. Clip arms 80b substantially define a clip inside diameter $D_{80}$. Illustrated on clip 80 are two zones of constant force CF on either side of clip 80. In one embodiment, when clip 80 is engaged with ball 22a or 52a as described in the above embodiments, constant force CF zones are created by the interference between the greatest outside diameter $D_{22}$ or $D_{52}$ of ball 22a or 52a and the inside diameter $D_{80}$ of clip 80. Constant force is also illustrated by the equal magnitude force arrows directed along radial lines extending outward from the inside diameter of clip 80, where ball 22a or 52a applies the force by virtue of its outside diameter being larger than the inside diameter of clip 80.

Also illustrated in the figure is the angle θ between the y-axis and the first point of interference between arm 80b and a ball (such as ball 22a or 52a). Where clip 80 is symmetrical as illustrated, the points of interference on either side will be 2θ.

Figure 6B:
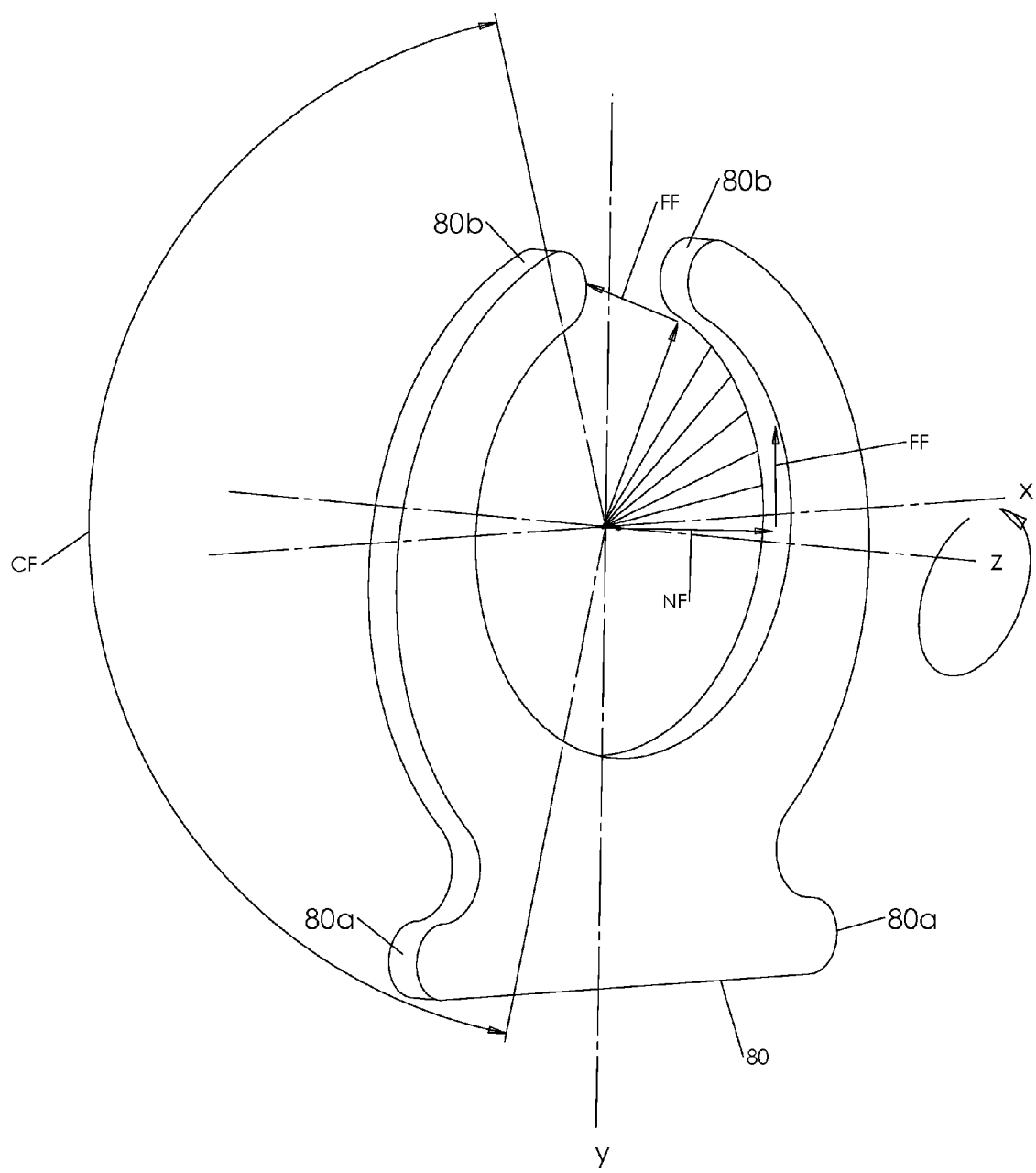

Although the two zones of constant force CF provide consistent torque for multi-axis clip hinges 20 and 50 over any given axis of rotation, there can be variation of torque among the three axes of rotation in some embodiments. FIG. 6b illustrates forces for a ball (such as ball 22a or 52a) along the inside diameter of clip 80 rotating about the z-axis (only one zone of constant force CF is labeled for simplicity on the figure). As illustrated, the rotation of the ball results in a frictional force FF at right angles with each element of pressure or normal force NF in the direction of rotation, each also at a constant radius R of half the clip inside diameter $D_{80}$.

Thus each element of pressure results in an equivalent element of torque. (For ease of illustration, only a single quadrant is shown in this and in the following comparative figures).

Figure 6C:
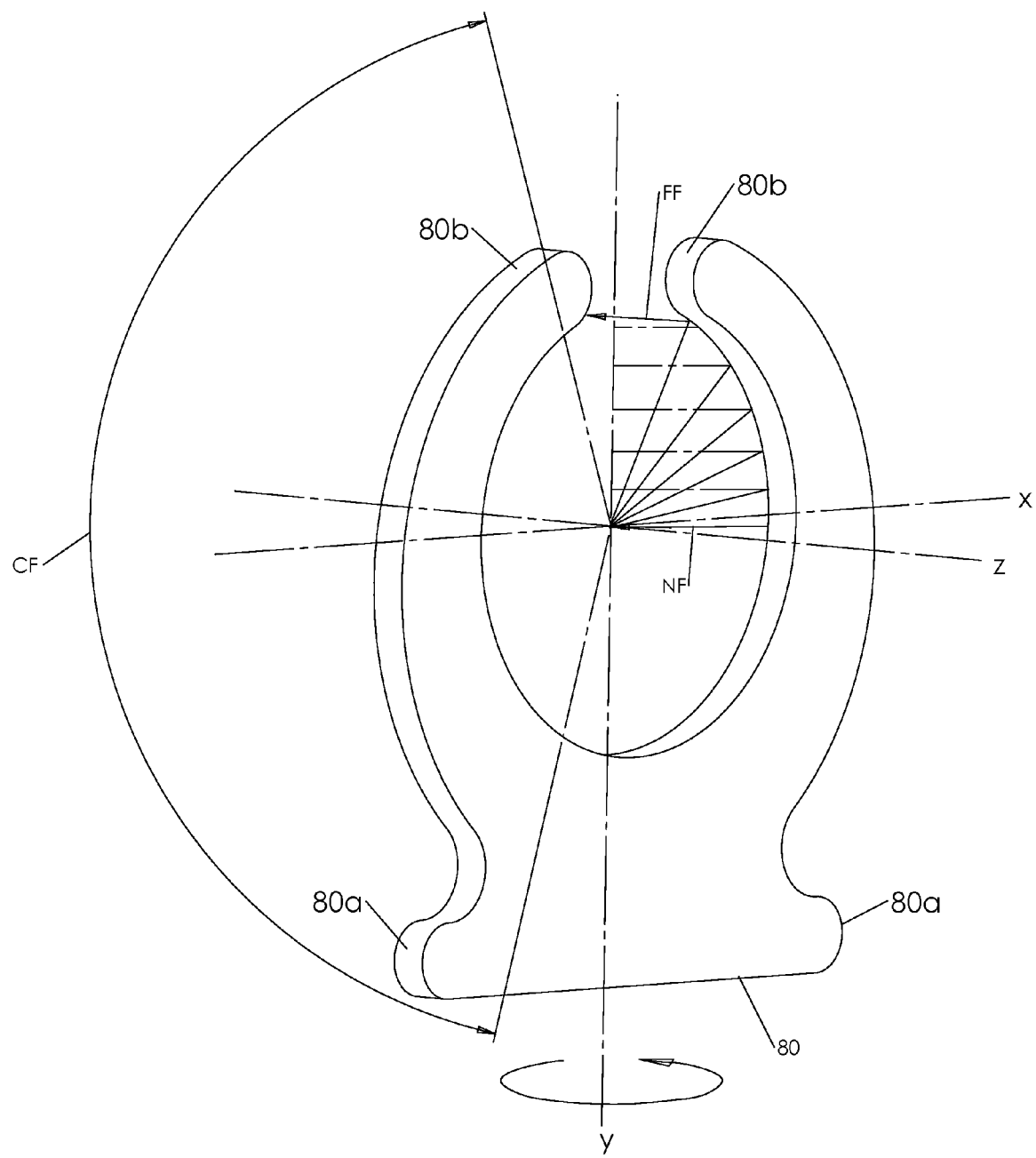

However, rotating the ball about the y-axis gives a different result, as illustrated in FIG. 6c. Here each element of pressure along a radial line NF results in a frictional force FF along the z-axis. However, these frictional forces act along varying radii from the axis of rotation y (dotted lines)—from R to R Cos θ—to create a different total torque than illustrated in FIG. 6b.

Figure 6D:
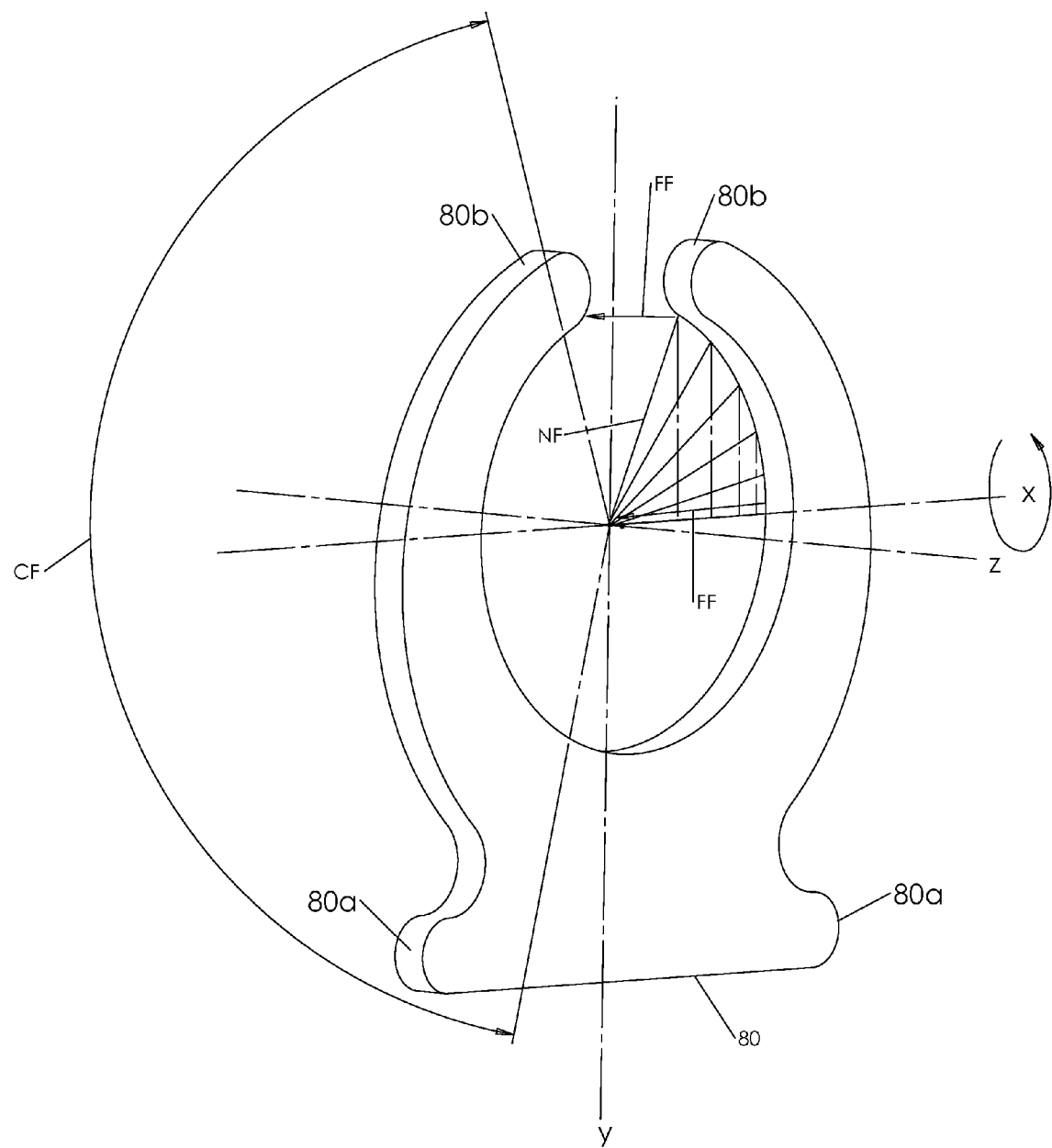

Similarly, rotation about the x-axis as illustrated in FIG. 6d will yield yet a different result. Here the frictional force FF in the quadrant illustrated is again directed along the z-axis, but along varying radii from the x-rotational axis (dotted lines), again resulting in a unique torque for this rotational direction. (The radius in this case varies from 0 to R Sin θ.)

Figure 7:
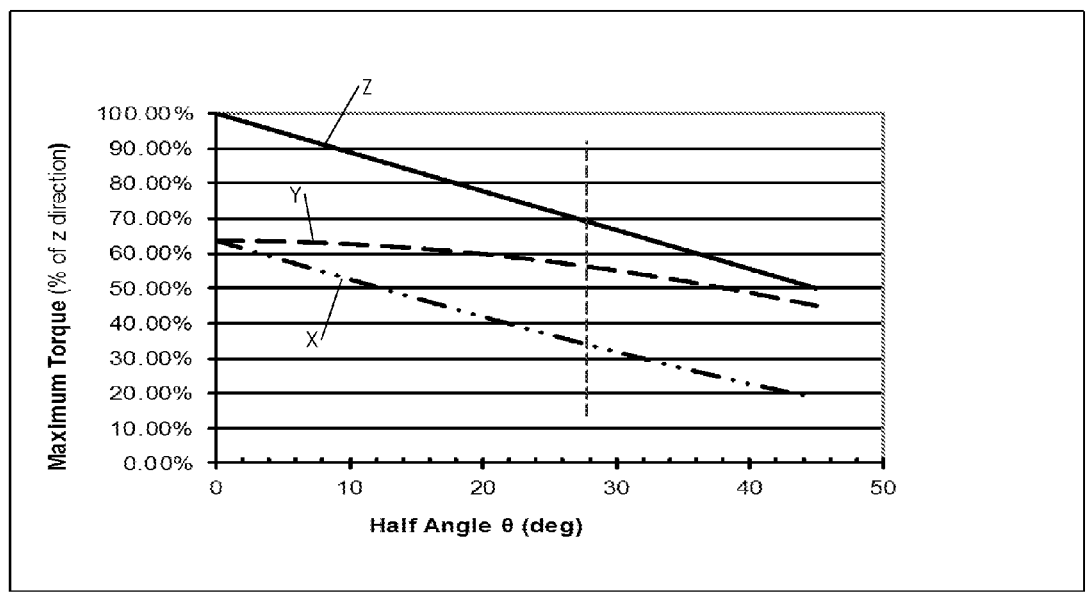
FIG. 7 is graph illustrating maximum torque varying as half angle changes for x-, y-, and z-axis rotation in accordance with one embodiment.

By varying the angle θ, which governs the extent of the constant pressure zones, different torques may be configured in each axis of rotation (albeit these are not independent). FIG. 7 shows a graph of how varying theoretically influences the torque in each axis of rotation, the toque is illustrated for the z-axis rotation, y-axis rotation and x-axis rotation. The results are shown as a percentage of maximum torque rotating about the z-axis.

As shown in FIG. 7, for small angles of θ, y-axis and x-axis torque are nearly equal, but both less than z-axis torque. As θ increases, z-axis and y-axis torque are more nearly equal, and both are greater than x-axis torque. FIG. 6a shows a clip design for θ=26 degrees, and is referenced in FIG. 7.

As such, by designing clip 80 with appropriate constant force CF zones, desired torque characteristics for a given application of multi-axis clip hinges 20 and 50 can be achieved. Such clips can be configured by forming or stamping clips to the desired configurations, or relieving certain areas along the inside diameter of the clip. For example, to ensure constant force CF zones in FIG. 6a, clip 80 may be relieved in area 80c, between the two constant force CF zones to minimize any interference in that area between the clip and the ball. This can be accomplished by slightly grinding a very thin layer of material of the inside diameter of clip 80 at area 80c. In this way, there will be very little interference between clip 80 and the ball in area 80c, and instead interference with the ball will be focused in the two constant force CF zones.

Figure 8:
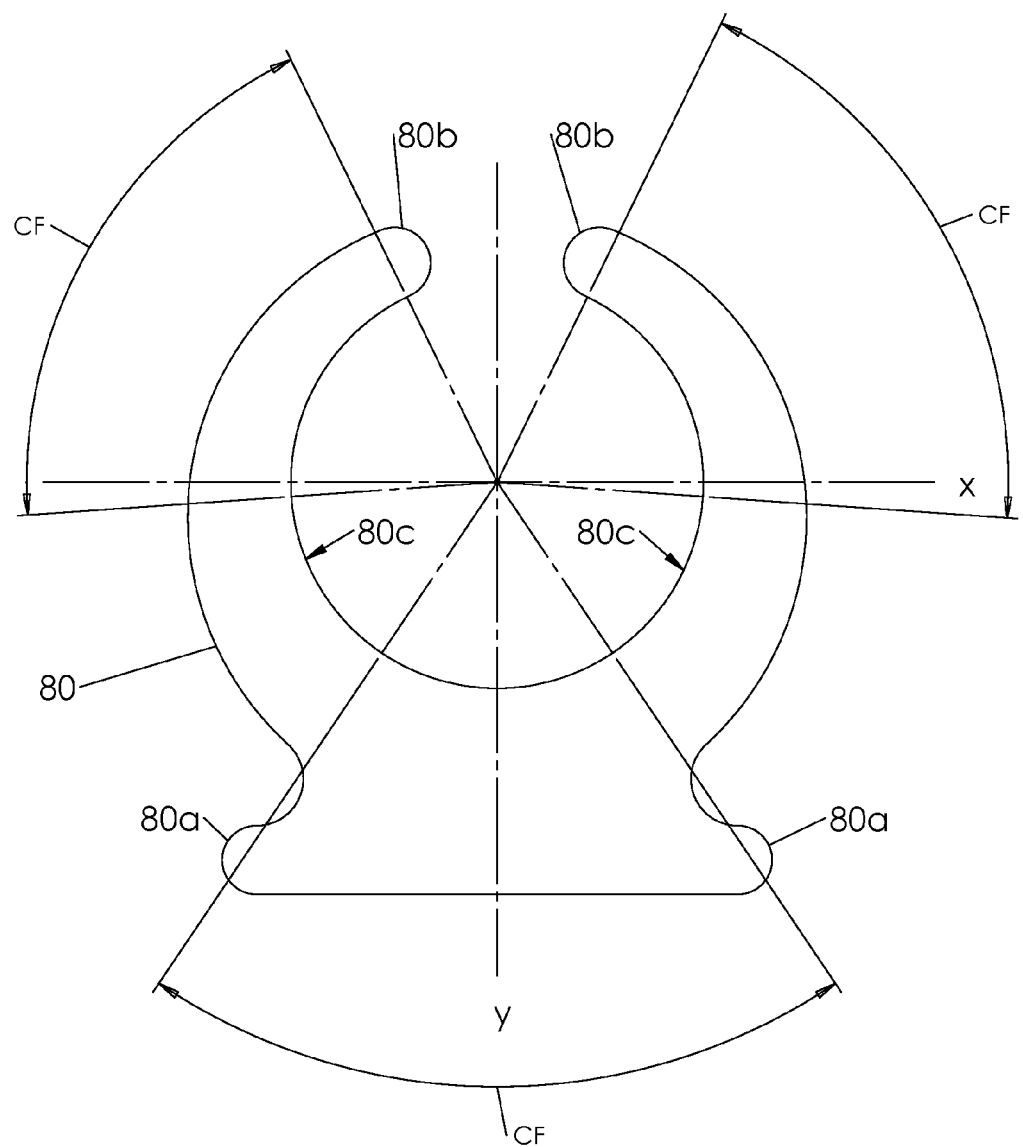
FIG. 8 is perspective view of a clip from a multi-axis clip hinge illustrating forces in accordance with one embodiment.

Other configurations are also possible for clips such that different zones of force are created. Such alternative configurations can achieve different torques in the three rotational axes. Although two constant pressure zones are illustrated in the previous examples, the clip may be configured with greater or fewer zones of pressure. For example, FIG. 8 illustrates shows clip 80 configured with three zones of constant force CF. This configuration of clip 80 results in a different torque profile than given in FIG. 7 for the two zone pressure clip.

A clip 80 with three constant force CF zones such as in FIG. 8 can be configured by forming or stamping clips to the desired configurations, or relieving certain areas along the inside diameter of the clip. For example, clip 80 may be relieved in areas 80c, each between the two constant force CF zones, in order to minimize any interference in that area between the clip and the ball. More or less zones of constant force CF can be created.

Figure 9:
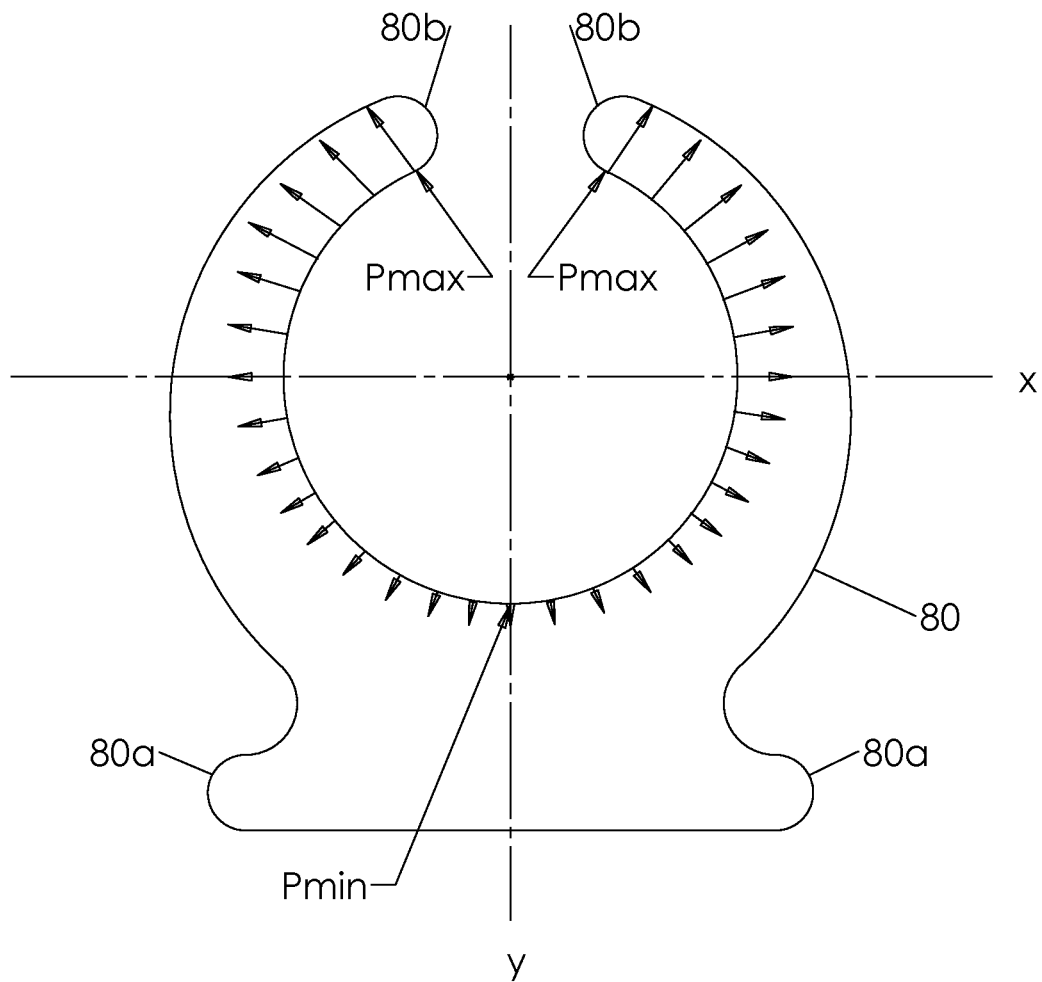
FIG. 9 is perspective view of a clip from a multi-axis clip hinge illustrating forces in accordance with one embodiment.

In addition to constant force zones, clips can be designed with non-constant pressure zones, such as illustrated in FIG. 9. In this configuration, clip 80 is configured to have maximum interference between clip 80 and a ball near the ends of arms 80b where the ball and arms 80b first engage $P_{max}$. Clip 80 is then configured to have gradually decreasing interference between clip 80 and a ball moving from the ends of clips arms 80a down toward the clip center, at which point the interference reaches a minimum $P_{min}$. This configuration for clip 80 will again alter the relationship between the torque in three axes. Each of the various configurations of clip 80 in FIGS. 6-9 can be used in any of the embodiments herein described to achieve the desired torque profile for a given application.

Figure 10A:
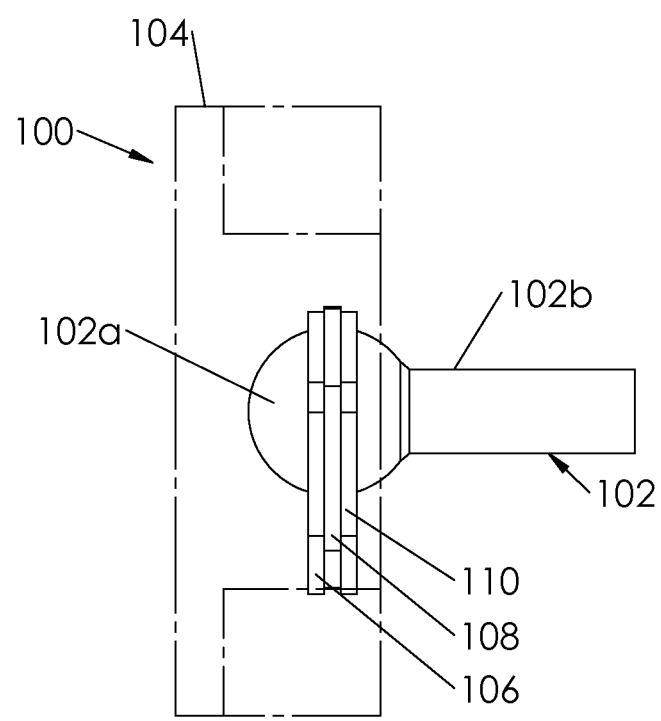
FIG. 10a is a side view of a multi-axis clip hinge with a ghosted housing in accordance with one embodiment.
Figure 10B:
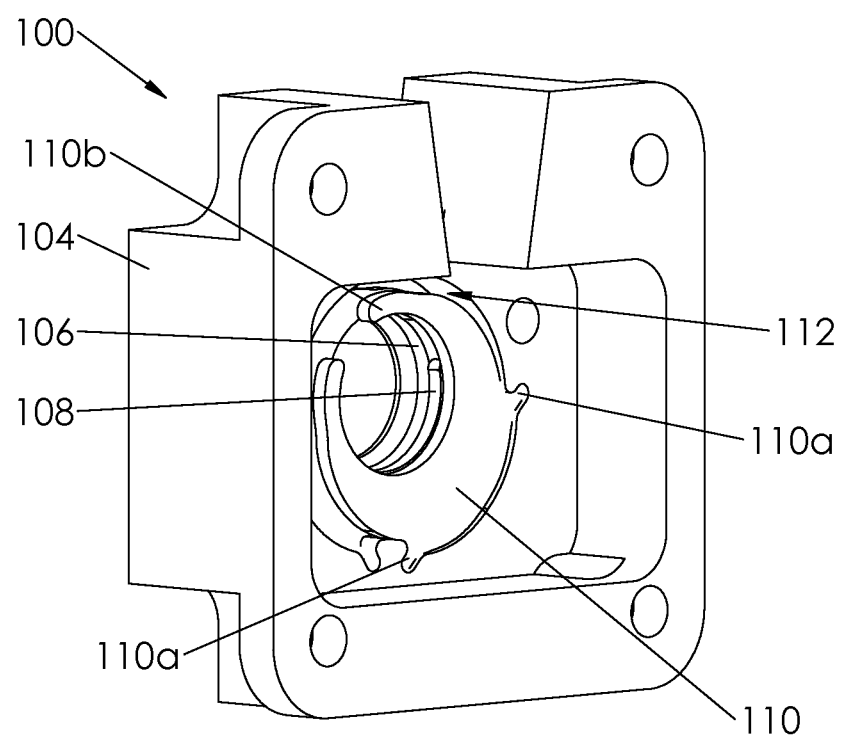
FIG. 10b is a perspective view of a multi-axis clip hinge in accordance with one embodiment.
Figure 10C:
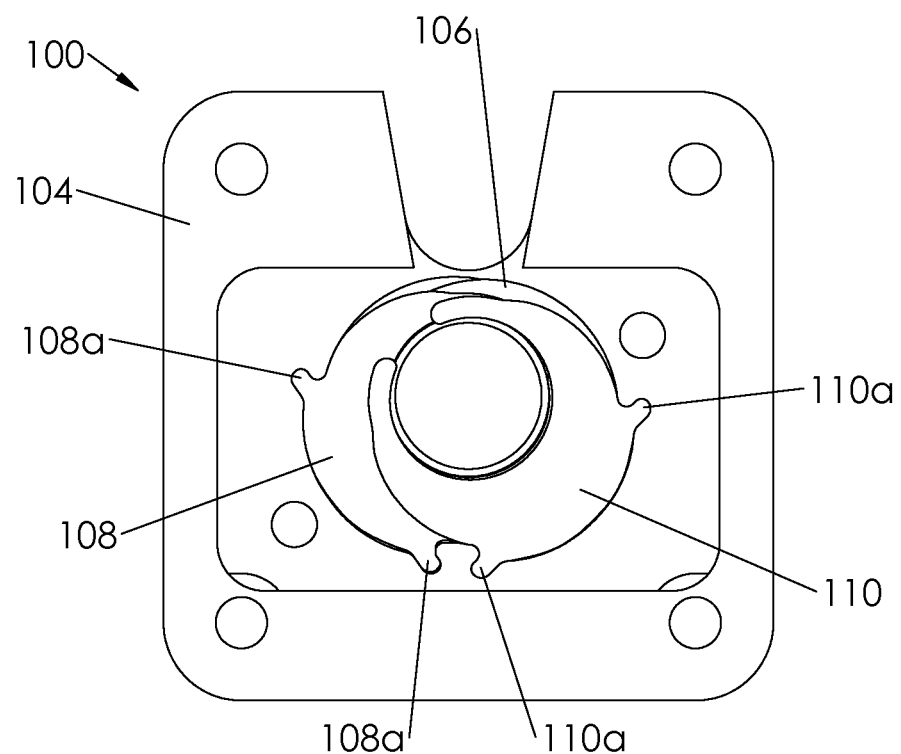
FIG. 10c is an end view of a multi-axis clip hinge in accordance with one embodiment.

FIGS. 10a-10c illustrates side, perspective and end views of multi-axis clip hinge 100 in accordance with one embodiment. Multi-axis clip hinge 100 is configured to provide consistent reliable torque performance in all three axes of rotation, as described above with respect to multi-axis clip hinges 20 and 50. Multi-axis clip hinge 100 includes pivotable ball 102 and housing 104. In FIG. 10a, housing 104 is ghosted to reveal components therein. Pivotable ball 102 includes ball 102a and input rod 102b. Furthermore, multi-axis clip hinge 100 includes first, second and third clips 106, 108 and 110. When assembled within housing 104, first, second and third clips 106, 108 and 110 and pivotable ball 102 are secured and substantially contained.

Multi-axis clip hinge 100 is configured similarly to multi-axis clip hinges 20 and 50 above, but further includes three clips. In one embodiment, each of clips 106, 108 and 110 are respectively seated within a slot formed within housing 104. Slot 112 in housing 104 is illustrated in FIG. 10b holding third clip 110. As illustrated, slot 112 conforms to third clip 110 such that it provides a complementary shape for clip feet 110a. In this way, there can be no relative movement of housing 104 third clip 110 (or the other two clips by virtue of their being seated in analogous slots). As further illustrated, slot 112 accommodates clips arms 110b without interference so that clip arms 110b may flex radially as they are engaged in interference with ball 102a. Housing 104 has similar slots configured to receive first and second clips 106 and 108 in the same way.

As such, when multi-axis clip hinge 100 is assembled, housing 104 secures first, second and third clips 106, 108 and 110 such that forces applied to input rod 102b will not move first, second and third clips 106, 108 and 110 relative to housing 104. Furthermore, when multi-axis clip hinge 100 is assembled, ball 102a is firmly held by interference contact with the arms of clips 106, 108 and 110. Again, each of first, second and third clips 106, 108 and 110 have an inside diameter at a relaxed state that is smaller than the greatest outside diameter of ball 102a, thereby creating the interference contact when the clips are forced over the ball. This allows rotation of input rod 102b in the three axes of rotation, but prevents translational movement of ball 102a relative to clips 106, 108 and 110.

Furthermore, FIGS. 10a-10c illustrate that first, second and third clips 106, 108 and 110 are not all oriented in the same angular position relative to each other. As shown, first and third clips 106 and 110 are oriented with the same angular position, and second clip 108 is offset by 120 degrees. This configuration will result in yet another unique configuration of torque in three axis.

In multi-axis clip hinge 100, only second clip 108 is at maximum interference with the ball 102a. Second clip 108 is centered on the greatest diameter of ball 102a, while first and third clips 106 and 110 are positioned on a slightly lesser diameter of the ball on either side, thereby giving—for a common clip configuration—less interference and less torque. This also provides the possibility of configuring clips that are not centered on the ball to give more equivalent torque by making them stiffer. As such, using multiple clips oriented differently with respect to one another is another way to alter the magnitude of torque in the three axes.

Furthermore, alternative embodiments such as those that combine one or more features from multi-axis clip hinges 20, 50 and 100 as described previously, are possible. Also, other housing combinations are possible. For example, portions of multi-axis clip hinges 20 and 50 illustrated respectively in FIGS. 3 and 5b can be overmolded with a plastic housing such that the clips and housing can be fixed together preventing relative translational movement of the clips and ball, but still affording relative rotational movement in the three axes of rotation.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A multi-axis clip hinge comprising:
   a rotatable member comprising a spherical portion with a greatest outer diameter and a coupling portion for articulating said member;
   a plurality of clips each comprising at least one arm defining an inside diameter and comprising a connection portion;
   wherein the inside diameter of the at least one arm in a relaxed state is less than the greatest outer diameter of the spherical portion of the rotatable member and wherein the at least one arm is forced over and substantially contains the spherical portion and is engaged therewith such that the at least one arm interferes with and grips the outside diameter of the spherical portion; and
   a housing configured to engage the connection portions of the plurality of clips thereby securing the clips to the housing and further configured to allow the at least one arm of the plurality of clips to flex in the radial direction away from the rotatable member without interference from the housing, the clips or the housing preventing relative translational movement of the clip relative to the spherical portion and allowing the spherical portion to rotate in three axes of rotation relative to the clip.

2. The multi-axis clip hinge of claim 1, wherein the plurality of clips have a width in an axial direction and the greatest outer diameter of the spherical portion is prevented from movement in the axial direction relative to the clip width by at least one of the clip and the housing.

3. The multi-axis clip hinge of claim 1, wherein a surface along the inside diameter of the clip comprises at least one zone of constant force.

4. The multi-axis clip hinge of claim 1, wherein a surface along the inside diameter of the clip comprises one or more variable pressure zones.

5. The multi-axis clip hinge of claim 1, wherein the plurality of clips are die stamped such that each have a cut portion and a ripped portion and wherein the ripped portions of the clips are oriented relative to each other to affect the torque of multi-axis clip hinge.

6. The multi-axis clip hinge of claim 1, wherein the housing further comprises features configured to prevent translational movement of the clip relative to the spherical portion, the features further configured to allow the spherical portion to rotate in three axes of rotation relative to the clip.

7. A multi-axis clip hinge comprising:
   a first member with a spherical structure and connecting structure for articulating said member, the spherical structure having an outer diameter;
   a second member comprising a plurality of clips each comprising at least one arm engaging the spherical structure and an inside diameter configured less than that of the outer diameter of the spherical structure such that it interferes with and grips the outside diameter of the spherical structure, and the clips comprising a connection portion extending radially on the clips and configured to secure the second member to a third member, preventing translational movement of the clips relative to the spherical structure, while allowing three degrees of rotation of the spherical structure relative to the clips;
   the third member comprising a housing having a slot that is complementary shaped to the connection portion and receives the connection portion to fixedly securing the clips relative to the housing, the housing further securing positioning of the center of the spherical structure relative to the housing and configured to allow the at least one arm of the plurality of clips to flex in the radial direction away from the spherical structure without interference from the housing, while allowing the spherical structure three degrees of rotation relative to the housing.

8. The multi-axis clip hinge of claim 7, wherein the plurality of clips comprise different relative shapes of constant pressure zones.

9. The multi-axis clip hinge of claim 7, wherein the plurality of clips comprise different numbers of constant pressure zones.

10. The multi-axis clip hinge of claim 7, wherein the plurality of clips comprise at least one clip comprising variable pressure zones.

11. A multi-axis clip hinge comprising:
    a pivotable ball with an input rod and a ball, the ball having a greatest outer diameter;
    a clip defining an inside diameter and comprising a connection portion;
    wherein the clip is positioned over the ball and wherein the inside diameter of the clip in a relaxed state is less than the greatest outer diameter of the ball such that clip interferes with and grips the outside diameter of the ball; and
    a housing configured to engage the connection portion of the clip thereby securing the clip to the housing, at least one of the clip and the housing preventing relative translational movement of the clip relative to the ball as the ball is rotated relative to the clip with movement of the input rod, the housing further configured to allow the clip to flex in the radial direction away from the ball without interference from the housing.

12. The multi-axis clip hinge of claim 11, wherein the housing further comprises features configured to prevent translational movement of the clip relative to the ball, the features further configured to allow the ball to rotate in three axes of rotation relative to the clip.

13. The multi-axis clip hinge of claim 11, wherein the input rod is configured along an axis and such that it can be rotated about its axis and moved up and down and back and forth relative to its axis, all such movement causing rotation of the ball within the clip without relative translational movement thereto.

* * * * *